(12) United States Patent
Antonucci

(10) Patent No.: US 10,077,796 B2
(45) Date of Patent: Sep. 18, 2018

(54) SEGMENT FOR SPACING APPARATUS USED IN CONJUNCTION WITH ELECTRICAL BOXES

(71) Applicant: Mark Antonucci, Hampstead, NC (US)

(72) Inventor: Mark Antonucci, Hampstead, NC (US)

( * ) Notice: Subject to any disclaimer, the term of this patent is extended or adjusted under 35 U.S.C. 154(b) by 425 days.

(21) Appl. No.: 14/847,850

(22) Filed: Sep. 8, 2015

(65) Prior Publication Data

US 2016/0069381 A1 Mar. 10, 2016

Related U.S. Application Data

(60) Provisional application No. 62/047,613, filed on Sep. 8, 2014.

(51) Int. Cl.
| | |
|---|---|
| *F16B 43/02* | (2006.01) |
| *F16B 43/00* | (2006.01) |
| *H02G 3/10* | (2006.01) |

(52) U.S. Cl.
CPC ............. *F16B 43/003* (2013.01); *H02G 3/10* (2013.01)

(58) Field of Classification Search
USPC .......................................................... 411/547
See application file for complete search history.

(56) References Cited

U.S. PATENT DOCUMENTS

| | | | | |
|---|---|---|---|---|
| 747,253 | A | * | 12/1903 | Smith |
| 1,102,871 | A | * | 7/1914 | Carroll ................... E04D 5/142 411/546 |
| 4,817,794 | A | * | 4/1989 | Workman ............... E04G 25/00 206/372 |
| 4,909,692 | A | * | 3/1990 | Hendren ................. F16B 43/00 174/57 |
| 5,108,243 | A | | 4/1992 | Antonucci |
| D386,388 | S | | 11/1997 | Antonucci |
| 5,921,737 | A | * | 7/1999 | Ibey ......................... H02G 3/18 411/535 |
| 6,176,666 | B1 | * | 1/2001 | Osterlund ................. F16B 5/02 411/535 |
| 9,303,356 | B2 | * | 4/2016 | Manninen ........... B32B 38/0004 |

FOREIGN PATENT DOCUMENTS

| | | |
|---|---|---|
| CA | 2047962 | 7/1992 |

* cited by examiner

*Primary Examiner* — Gary W Estremsky
(74) *Attorney, Agent, or Firm* — Russell D. Nugent; The Humphries Law Firm, P.C.

(57) ABSTRACT

A section of a folding spacer apparatus for ensuring precise spatial increments when stacking segments of the spacer apparatus having at least two identical segments of equal thickness equal to an incremental measurement frequently utilized in the construction industry joined by a thin and pliable length of material enabling the bottom surface of a first segment to be flush with the top surface of a second segment when the segments are stacked. The segments are made without corners. In addition, the segments feature a system whereby the two segments may be snapped to one another when stacked. Specifically, first segment features at least one protrusion extending perpendicularly from its top surface, and the second segment should feature at least one complimentary cavity in its top surface, the dimensions and volume of the cavity being such that the protrusion of the first segment is snugly fit within the cavity.

17 Claims, 7 Drawing Sheets

SEGMENT FOR SPACING APPARATUS USED IN CONJUNCTION WITH ELECTRICAL BOXES

CROSS-REFERENCE TO RELATED APPLICATIONS

This application claims the benefit of priority to U.S. Provisional Application No. 62/047,613 filed Sep. 8, 2014. The contents of U.S. Provisional Application No. 62/047,613 are incorporated by reference herein in its entirety.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

SEQUENCE LISTING

Not Applicable.

BACKGROUND OF THE INVENTION (a) Field of the Invention

The present invention relates to the field of electrical wiring installations. More particularly the present invention relates to the field of spacing means used in conjunction with electrical wiring boxes and screw fastening means.

(b) Background Art

When installing indoor electrical switch and outlet plates on the walls, electrical wiring boxes are often placed inside the walls behind the electrical plates. Electrical wiring boxes are usually rectangular shaped metal, plastic or fiberglass box frames with various openings and holes for mounting with screws and running electrical wires. The dividing walls in modern homes and offices typically have a hard central portion and a surface portion. The hard central portion is the major part of a wall, which stands the stress, and is what is ordinarily called the "wall". The surface portion, often called "dry wall", is the exposed part that is later placed as a covering onto the center portion of the wall for decoration and other purposes, and is usually made of tile or similar light material. In the following discussion if not otherwise specified, the word "wall" is used to specify the central portion of a wall, and the word "dry wall" is used to specify the surface portion of a wall.

In the practice of indoor electrical installations, within an open wall an electrical wiring box is installed, and upon closing of the wall with dry wall, a square shaped chamber is cut out from the dry wall. The size of chamber is usually greater than the size of the electrical wiring box to which the chamber pertains. The electrical box often has receiving arms and mounting arms with screw holes. Mounting arms can be fastened to an edge of the chamber by using nails or fastening screws to tightly mount the electrical box to the wall. After the electrical box is installed into the wall, dry wall is placed over the wall, and an opening is cut out at the position of the electrical box for installing electrical wall plates such as electrical switch plates or power outlet plates. Typically, these electrical wall plates have mounting arms with screw holes. If there is no dry wall, mounting arms of these electrical wall plates may be directly brought into contact with receiving arms of the electrical box and fastened by screws. However, due to the thickness of the drywall and the resulting gap between the electrical wall plate mounting arms and the electrical box receiving arms, it can be difficult to mount these electrical wall plates when there is dry wall covering the wall.

Historically, electricians either wrap a lot of wire around the screws or, alternatively, use other shims such as rings of washers to provide means with a certain thickness to fill the gap between the electrical wall plate mounting arms and the electrical box receiving arms caused by the presence of the dry wall. These conventional approaches are both inconvenient and unstable.

In recognition of the inconvenience of the above-identified electrician "work-arounds", a plastic foldable spacer to be used in conjunction with electrical boxes has further been developed in the prior art. The plastic foldable spacer known in the prior art is an elongated strip of a certain thickness comprising a series of foldable sections that may be folded into a corrugated spacer which is designed to have a precise thickness based on the number of sections, each section having a defined and consistent thickness when folded. Each of the sections of the foldable strip has a screw hole at the center, resulting in a corrugated spacer having a central screw hole allowing a screw to go through to fasten the mounting arms of the electrical wall plate to the receiving arms of the electrical box. The strip is typically formed of plastic and recent improvements in the design have yielded strips comprising a chain of adjoined segments, each adjoining segment having the ability to snap to the counterpart segment to which it is adjoined, and a central slot cut in to each segment in lieu of a central hole, thus allowing the folded spacer to be slid on to an existing screw binding an electrical wall plate mounting arm to an electrical box receiving arm.

While the use of the above-described plastic foldable spacer is a marked improvement over the inconvenient and unstable conventional approaches previously discussed, a significant shortcoming remains in that the segments of these folding spacers do not stack flush due to the combination of the material resistance in folding the apparatus and the insufficient length of the hinges adjoining the segments. Because the segments do not stack flush upon one another the precision of a desired thickness in using the spacer apparatus is compromised and a user can never be sure of the precise thickness needed or used to space the gap between the mounting arms of the electrical wall plate and the receiving arms of the electrical box.

A further shortcoming in the foldable spacers known in the prior art is that the segments of the folding spacers are all rectangular prisms in shape, meaning that each segment contains at least eight (8) right angle corners that have a tendency to catch on clothing and tool pouches and pockets when a user is attempting to grab a spacer for use on a project. Being that the segment corners are an unneeded feature of the device and, in fact, constitute a nuisance in the use of the foldable spacers known in the prior art, the extra material required to form the corners is a material waste that can be quite expensive in the context of mass production of the foldable spacer.

Accordingly, there is a need in the prior art for a convenient and stable means of spacing the dry wall gap between the mounting arms of an electrical wall plate and the receiving arms of an electrical box, the means to be capable of precise and incremental augmentation of the spacer thickness on an as needed basis by a user. By way of example, the specific contemplated need in the prior art is for a user to be able to precisely insert a ⅛" spacer, a ¼" spacer, a ⅜" spacer, etc. using a single spacer device.

It is therefore an object of the present invention to provide an elongated strip which may be torn or cut to any desired thickness comprising a series of foldable sections, so that the elongated strip can be folded into a corrugated spacer which has a precise thickness as determined by folding on top of each other multiple sections, each having a precise thickness, and in turn can be used to fill the gap between two corresponding mounting arms of the electrical wiring devices.

It is a further object of the present invention to provide a foldable strip with a series of sections, each having a screw slot extending from a common edge when the strip is folded to the center of each section, so that the resultant corrugated spacer will have a central screw slot and when used to fill the gap, is enabled to slip around an existing screw already anchored between the two corresponding mounting arms of the electrical wiring devices.

It is a still further object of the present invention to provide a foldable strip with a series of sections, each section being designed and constructed in such a way to use a minimal amount of material and further avoid the existence of corners on sections, thus allowing for easier handling and cost-savings in mass production of the overall device.

It is also an object of the present invention to provide a foldable strip made of thin sheets of plastic material, so that it will provide the desired flexibility with enough strength and insulation to be used with electricity.

Further novel features and other objects of the present invention will become apparent from the following detailed description and discussion, taken in conjunction with the drawings.

BRIEF SUMMARY OF THE INVENTION

The present invention is a section of a folding spacer apparatus for retaining precision in a desired thickness established by stacking the segments, the section comprising at least two identical segments, each segment being adjoined along an edge to the other segment by means of a thin and pliable length of material, the length of material being of sufficient length to enable the interface of the two segments to be flush when the segments are stacked on one another and being tapered to a minimum thickness at the midpoint in the length of material between the two adjoined segments. In practice, a first segment may be placed flush upon a congruent second segment by folding of the length of material at its minimum thickness midpoint and placing the congruent second segment flush on top of the first segment.

Specifically, the now contemplated invention comprises at least two identical segments as stated above, each segment being an equal and fixed thickness equal to an incremental measurement frequently utilized in the construction industry. The inventor believes it particularly useful that the segments be a thickness equal to incremental measurements of the class consisting of one-quarter inch (¼"), one-eighth inch (⅛"), or one-sixteenth inch (1/16"). The thickness of the individual segments is measured exclusive of the protrusions or cavities described below. In this sense and by way of example, a user can have confidence that a spacer comprising five segments stacked will precisely be a five-eighths inch (⅝") spacer, five-sixteenths inch (5/16") spacer, or one and one-quarter inch (1¼") spacer, as the case may be.

With more specificity, the thin and pliable length of material adjoining each segment to any other segment in the now disclosed inventive section should minimally be of a length greater than the thickness of any one segment adjoined. In practice, this length should enable the bottom surface of a first segment to be flush with the top surface of a second segment when the segments are stacked. Further, as contemplated, the tapering of the thin and pliable length of material to a minimum thickness at the midpoint in the length of material between the two adjoined segments is further believed to facilitate the flush stacking of the two segments by mitigating the material resistance and spring-action created by the folding of the length of material upon itself—the more substantial the length of material is at the fold-point, the greater tendency of the material to want to return to its original, unfolded configuration, thus, compromising the flush stacking of the attached segments. As noted above, because precision and accuracy in the incremental spacing measurements achieved via stacking of multiple segments is a primary objective of the now disclosed invention, the features of the thin and pliable length of material that yield or improve the flush stacking of the segments are thought to be critical to the success of the invention overall.

A preferred embodiment of the now contemplated invention specifically contemplates that the segments comprising the present invention be without corners. Whether taking the form of a cylindrical segment, an oblong prism segment, or a rounded rectangular prism segment, the inventor contemplates that the omission of corners from the segments will cause a dramatic decrease in the frequency with which devices utilizing the now disclosed inventive section catch on clothing and/or tool pouches or pockets when in use and, commensurately, a dramatic increase in the perceived convenience and ease of use. Further, the inventor contemplates that the omission of corners from the segments will substantially reduce the amount of material required to manufacture each unit and, therefore, will result in significant cost savings in the mass production of the inventive sections and/or devices utilizing the now disclosed inventive sections.

A further preferred embodiment of the now contemplated invention specifically contemplates that the segments comprising the present invention feature a system whereby the two segments may be snapped to one another when stacked. Specifically, the inventor contemplates that the first segment should feature at least one protrusion extending perpendicularly from its top surface, and the second segment should feature at least one complimentary cavity in its top surface, the dimensions and volume of the cavity being such that the protrusion of the first segment is snugly fit within the cavity, thus creating a snap together effect. The inventor further contemplates that the first segment featuring at least one protrusion extending perpendicularly from its top surface should also feature at least one cavity in its bottom surface identical to the cavity found in the top surface of the second segment, and the second segment should feature at least one protrusion extending perpendicularly from its bottom surface identical to the protrusion found on the top surface of the first segment—these additional protrusions and cavities in the two segments will enable the inventive section to be used in tandem with any number of other inventive sections in a single chain and/or strip.

DETAILED DESCRIPTION OF THE INVENTION

Figure 1:
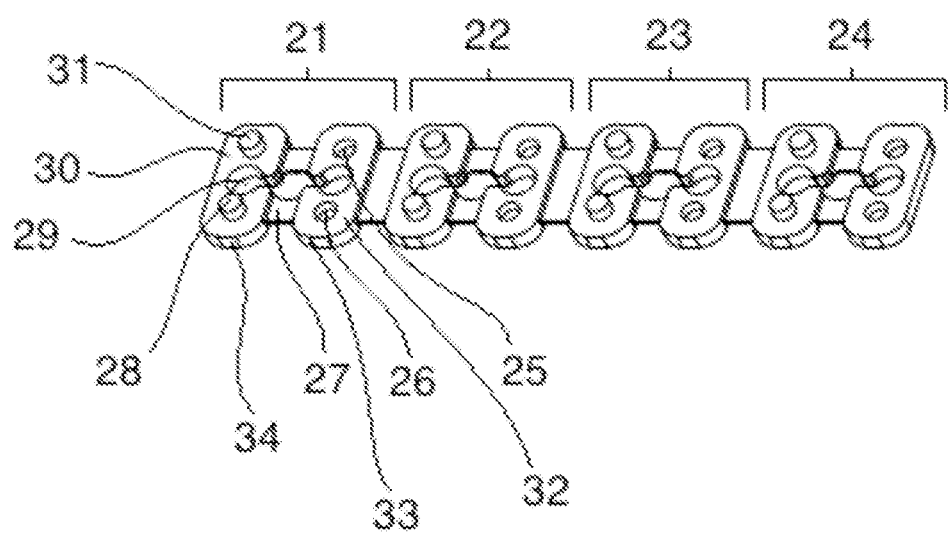
FIG. 1 is an isometric perspective view of a preferred embodiment of the present invention as a component part of a folding spacer apparatus.

Referring now to the invention in more detail, in FIG. 1 there is shown an isometric perspective view of a preferred embodiment of the present invention 21 coupled with an identical second inventive section 22, an identical third inventive section 23, and an identical fourth inventive section 24 to form a folding spacer apparatus. There is shown a first rounded rectangular prism segment 30 having an edge 34 having a precise and consistent thickness, a top surface featuring a first cylindrical protrusion 28 and a second identical cylindrical protrusion 31, a central slot 29, and a foldable hinge component 27 extending outward from its edge 34. Coupled with the first rounded rectangular prism segment 30 is a second rounded rectangular prism segment 32 having an edge 33 having a precise and consistent thickness, a top surface featuring a first cylindrical recess 26 and an identical second cylindrical recess 25, and a central slot that is reversed in orientation, but otherwise identical to the central slot 29 found in the first rounded rectangular prism segment 30. The second round rectangular prism segment 32 is attached to the first rounded rectangular prism segment 30 via the foldable hinge component 27 that extends from the edge 34 of the first rounded rectangular prism segment 30 to the edge 33 of the second rounded rectangular prism segment 32.

Still referring to FIG. 1, the first cylindrical recess 26 and identical second cylindrical recess 25 of the second rounded rectangular prism 32 compliment the first cylindrical protrusion 28 and the second identical cylindrical protrusion 31 of the first rounded rectangular prism segment 30 such that when the foldable hinge component 27 is folded at the midpoint in its length, the first rounded rectangular prism segment 30 may rest on top of the second rounded rectangular prism segment 32, and the two segments may be "snapped together" by insertion of the first cylindrical protrusion 28 into the first cylindrical recess 26 and insertion of the second identical cylindrical protrusion 31 into the second identical cylindrical recess 25. In this way, the top surface of the first rounded rectangular prism segment 30 may be placed in direct flush contact with the top surface of the second rounded rectangular prism segment 32 and effectively stacked upon one another.

Figure 2:
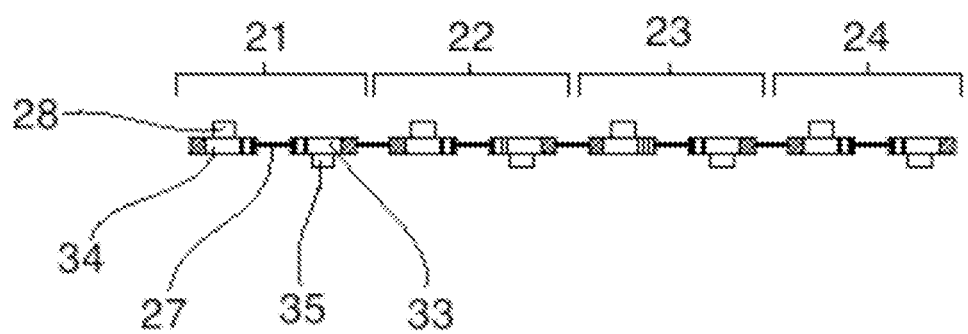
FIG. 2 is a side perspective view of the preferred embodiment of the present invention as a component part of a folding spacer apparatus, as shown in FIG. 1.

Referring now to the invention in more detail, in FIG. 2 there is shown a side perspective view of the preferred embodiment of the present invention 21 coupled with an identical second inventive section 22, an identical third inventive section 23, and an identical fourth inventive section 24 to form a folding spacer apparatus as previously shown in FIG. 1. Again, there is depicted a first rounded rectangular prism segment having an edge 34 of a precise and consistent thickness, a top surface featuring a first cylindrical protrusion 28 and a second identical cylindrical protrusion (though only the first cylindrical protrusion 28 is visible in the view provided), a central slot (not visible in the view provided), and a foldable hinge component 27 extending outward from its edge 34 and linking the first rounded rectangular prism segment to a second rounded rectangular prism segment having and edge 33 of a precise and consistent thickness, a first cylindrical recess (not visible in the view provided) and an identical second cylindrical recess (not visible in the view provided), and a central slot (not visible in the view provided) that is reversed in orientation, but otherwise identical to the central slot found in the first rounded rectangular prism segment. Further apparent in this view is a first cylindrical protrusion 35 from the bottom surface of the second rounded rectangular prism segment— there is an identical second cylindrical protrusion as well, however, the view provided does not allow the second protrusion to be seen here. The preferred embodiment contemplates that the bottom surface of the second rounded rectangular prism segment is to be identical to the top surface of the first rounded rectangular prism segment, each having a pair of identical cylindrical protrusions, and the bottom of the first rounded rectangular prism segment is to be identical to the top surface of the second rounded rectangular prism segment, each having a pair of identical cylindrical recesses. In this sense, the preferred embodiment of the inventive section 21 may be paired with any number of identical inventive sections in series and maintain the fold and "snap together" functionality found in the first inventive section alone.

Figure 3:
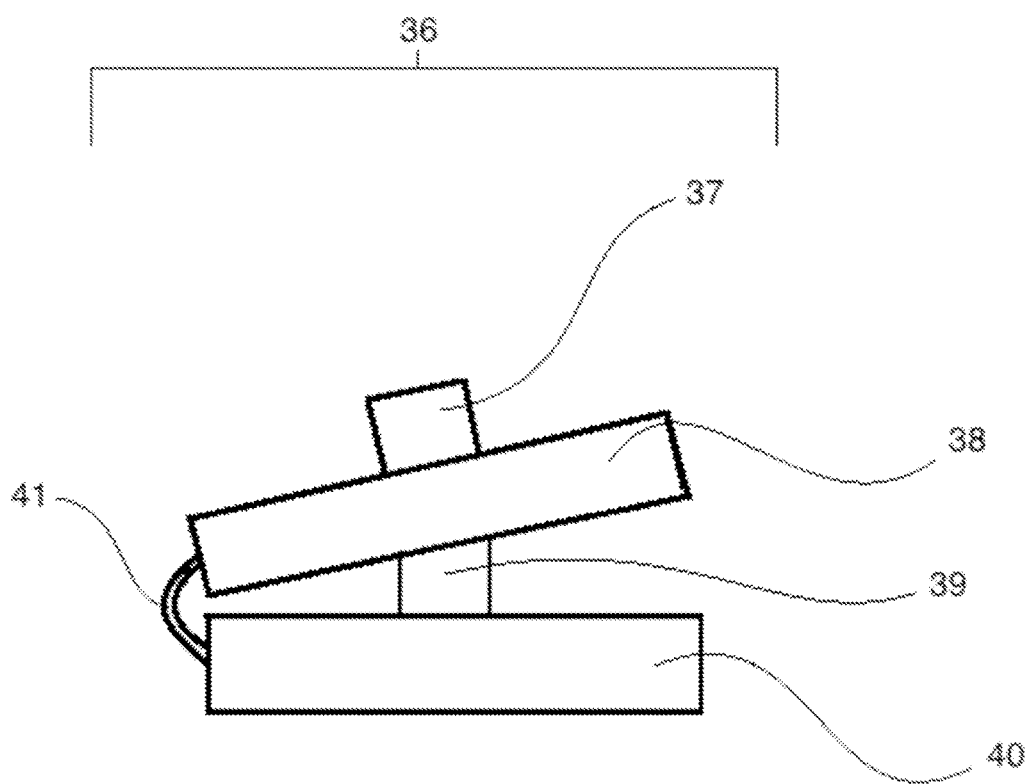
FIG. 3 is a side perspective view of a section of a folding spacer apparatus as is presently known in the prior art, depicted here to better articulate the shortcomings of the prior art.
Figure 4:
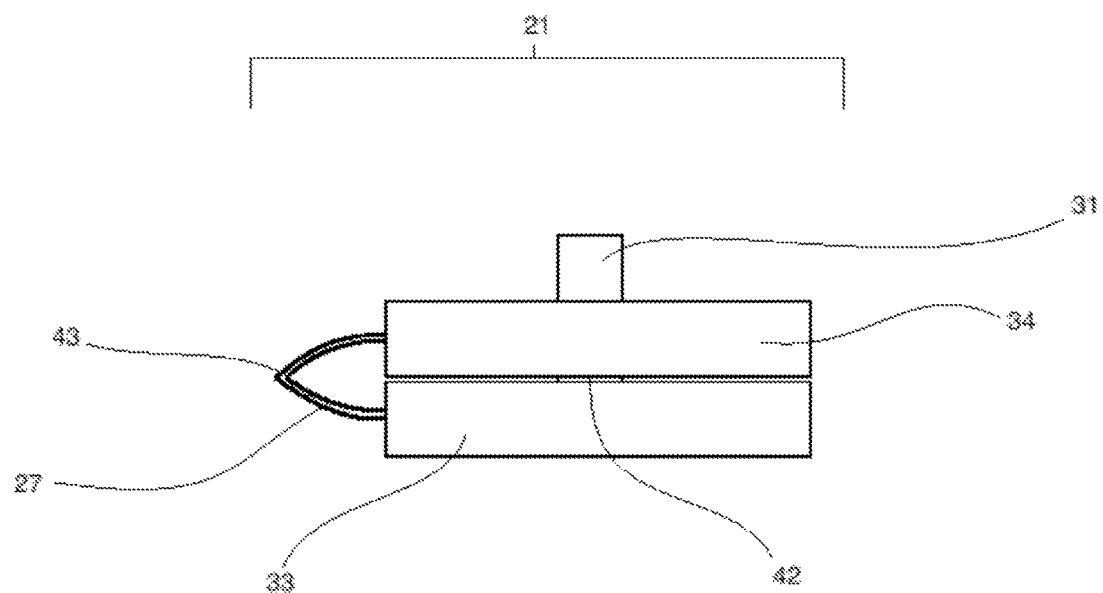
FIG. 4 is a side perspective view of the preferred embodiment of the present invention, as previously shown in FIG. 1 and FIG. 2.

Because the ability of the segments comprising the inventive section to stack in a manner flush to one another is contemplated to be the most primary benefit of the inventive section, FIG. 3 and FIG. 4 depict a section 36 as is now known in the prior art having a first segment 38 stacked upon a second segment 40 and the inventive section 21 having its first rounded rectangular prism segment 34 stacked upon its second rounded rectangular prism segment 33, respectively, for purposes of better highlighting the inventive advantages of the now disclosed inventive section. As before stated, a significant shortcoming in the prior art is that the segments of known folding spacers do not stack flush due to an inhibiting combination of the material resistance in folding the apparatus and the insufficient length of the hinges adjoining the segments in the folding spacer. Because the segments do not stack flush upon one another the precision of a desired thickness in using the spacer apparatus is compromised and a user can never be sure of the precise thickness needed or used to space the gap between the mounting arms of an electrical wall plate and the receiving arms of an electrical box. FIG. 3, depicts a section 36 as is commonly known in the prior art, wherein a first segment 38 is coupled to a second segment 40 by means of a folding hinge 41 constructed of a length of material joined to the first segment 38 at one end and joined to the second segment 40 at the second end. Further known in the prior art is the use of a protrusion 39 on the top surface of the second segment 40 that may be snapped into a recess (not visible in the view provided) in the bottom surface of the first segment 38. The first segment 38 further features a protrusion 37 from the top surface of the first segment 38 for the purpose of pairing with further segments in series. As shown, this section known in the prior art does effectively serve as a spacer accommodating the gap between the mounting arms of an electrical wall plate and the receiving arms of an electrical box; however, the inability of this section to stack segments flush upon each other leaves an inconsistent gap between the first segment 38 and the second segment 40. Because of the inconsistent gapping caused by the inability of the first segment 38 and second segment 40 to stack flush upon one another, a user can never be sure of the precise width of the gap into which the spacer is inserted between the mounting arms of an electrical wall plate and the receiving arms of an electrical box due to the uncertainty introduced by the inability of the first segment 38 and second segment 40 to rest flush against one another.

By contrast, FIG. 4 depicts a side perspective view of the preferred embodiment of the present invention, as previously shown in FIG. 1 and FIG. 2, the inventive segment 21 comprising a first rounded rectangular prism segment having an edge 34, a second rounded rectangular prism segment having an edge 33, a folding hinge component 27 extending from the edge 34 of the first rounded rectangular prism segment to the edge 33 of the second rounded rectangular prism segment and having a midpoint 43 that is the thinnest point along the length of the folding hinge component 27, a cylindrical protrusion 31 extending perpendicular from the bottom surface of the first rounded rectangular prism segment, a cylindrical recess (not visible in the view provided) in the top surface of the first rounded rectangular prism segment, and a cylindrical protrusion 42 extending perpendicular from the top surface of the second rounded rectangular prism segment. As depicted, the first prism segment has an edge 34 of a selected and consistent thickness, and the first prism rests flush upon the second prism segment that also has an edge 33 of an identical selected and consistent thickness as the edge 34 of the first prism segment. The first prism segment and second prism segment are secured in their stacked configuration by the frictional force of the cylindrical protrusion extending from the top surface of the second prism segment being inserted and "snapping" into the complimentary cylindrical recess (not visible in the view provided) in the top surface of the first prism segment. The additional length to the folding hinge component 27, and the relative material weakness at the midpoint 43 of the length of material comprising the folding hinge component 27 is the feature that allows the two depicted segments to stack flush and eliminates the inconsistent gap between the segments found in the prior art. In this sense, the present inventive section 21 can be utilized with segments having a thickness of x such that when the two segments are stacked upon one another, the user can know with certainty that the thickness of the resultant spacer is 2x.

Figure 5A:
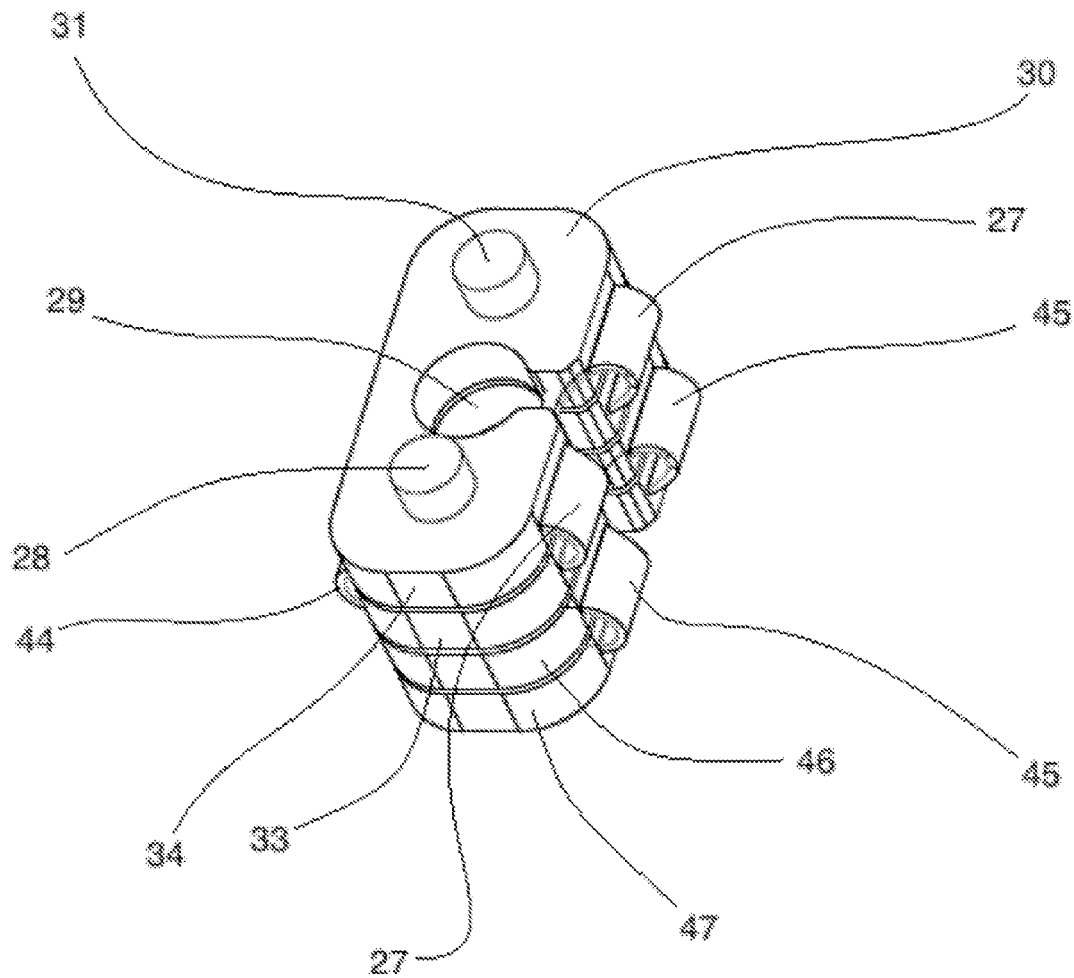
FIG. 5A is an isometric perspective view of the preferred embodiment of the present invention as a component part of a folding spacer apparatus that is in its folded configuration, as shown in FIG. 1, FIG. 2, and FIG. 4.
Figure 5B:
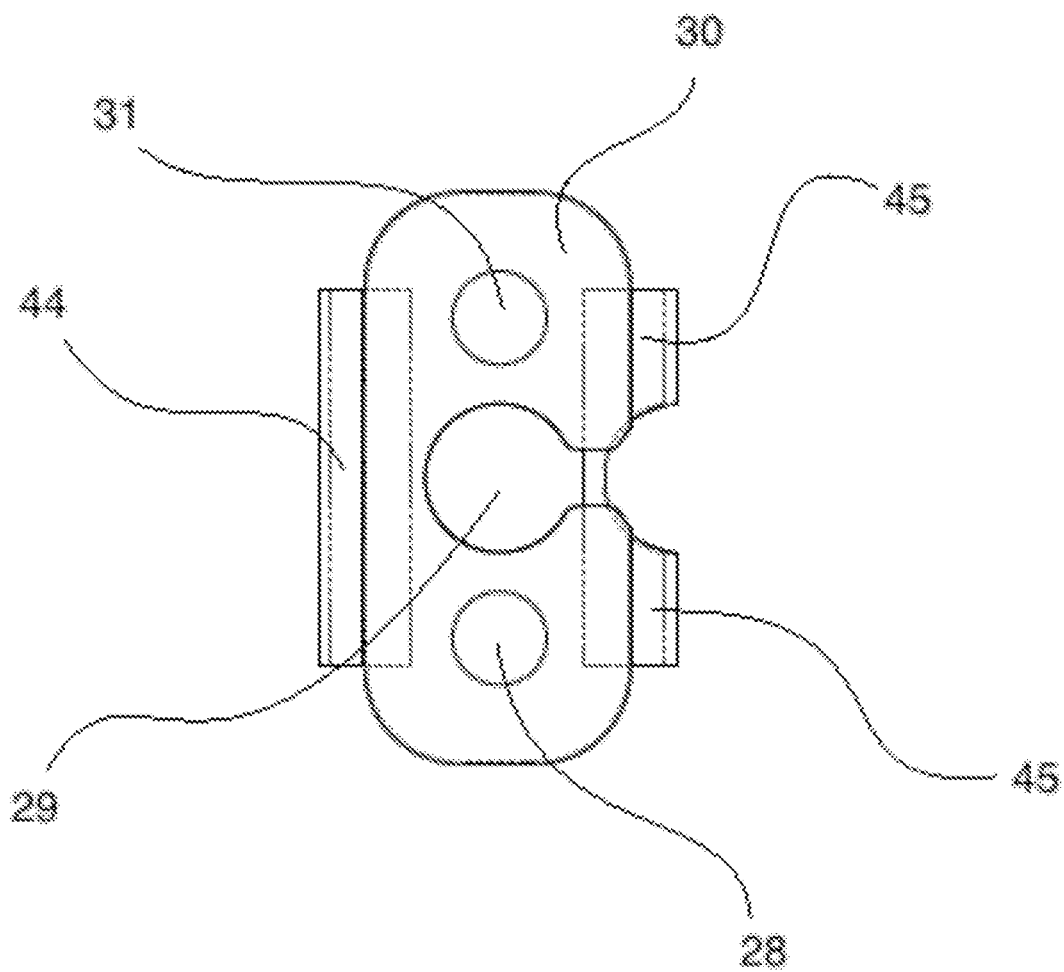
FIG. 5B is a top perspective view of the preferred embodiment of the present invention as a component part of a folding spacer apparatus that is in its folded configuration, as shown in FIG. 1, FIG. 2, FIG. 4 and FIG. 5A.

Defining the preferred embodiment of the inventive section in more detail, FIG. 5A and FIG. 5B depict at least two of the inventive sections used in tandem to create a spacer that the has an overall dimension equal to the sum of the thicknesses of the edge 34 of a first segment, the edge 33 of a second segment, the edge 46 of a third segment, and the edge 47 of a fourth segment. If each segment edge has a thickness of x, this resultant spacer can be said to have an overall thickness of precisely 4x. Again demonstrated in the illustration of FIG. 5A is a top surface of a first segment featuring a first cylindrical protrusion 28 and a second identical cylindrical protrusion 31, a central slot 29, and a foldable hinge component 27 extending outward from the edge 34 of the first segment to the edge 33 of the second segment. Just as the first segment is joined to the second segment by a foldable hinge component 27, the second segment is joined to the third segment by a foldable hinge component 44, and the third segment is joined to the fourth segment by a foldable hinge component 45. Of particular note in the FIG. 5A and FIG. 5B illustrations is the bifurcation of the first foldable hinge component 27 and the third foldable hinge component 45, as needed to maintain the open central slot 29 through the entirety of the stack of segments, thus allowing the resultant spacer to be readily snapped onto the shaft of an already anchored screw.

Figure 5C:
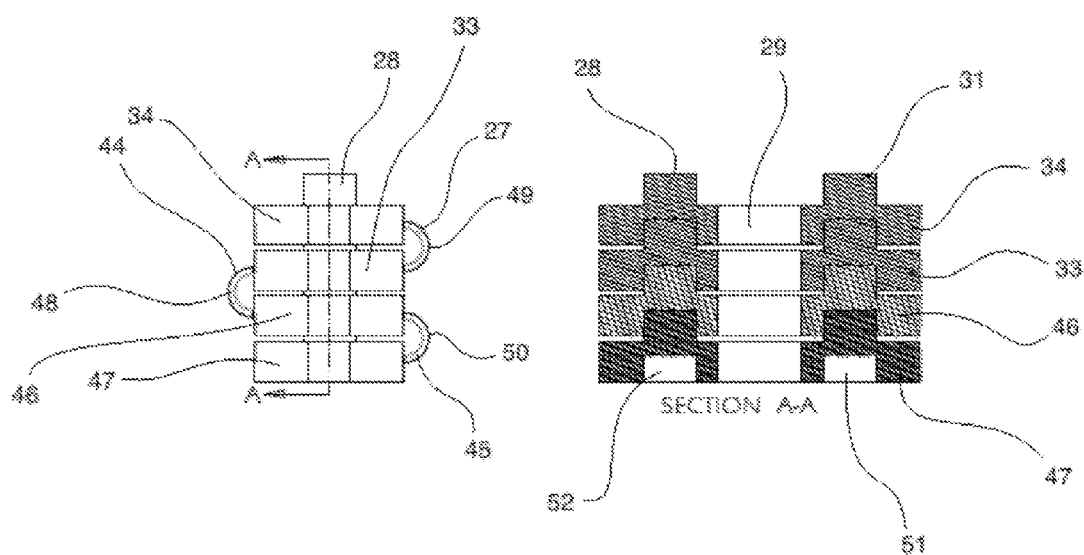
FIG. 5C is a side cross-sectional view of the preferred embodiment of the present invention as a component part of a folding spacer apparatus that is in its folded configuration, as shown in FIG. 1, FIG. 2, FIG. 4, FIG. 5A, and FIG. 5B.

In an effort to better impart the "snapping" mechanism of the inventive sections, FIG. 5C is presented as a cross-sectional view of the stack depicted in FIG. 5A and FIG. 5B. Again, there is shown two inventive sections used in tandem to create a spacer that the has an overall dimension equal to the sum of the thicknesses of the edge 34 of a first segment, the edge 33 of a second segment, the edge 46 of a third segment, and the edge 47 of a fourth segment. Further, FIG. 5C particularly gives a clearer view of how the contemplated top surface first protrusion 28 and second protrusion 31 are representative of the protrusions of any other segment that might readily fit into the first recess 52 and second recess 51 of the fourth segment depicted here, thus continuing the stack and elongating the spacer itself.

In practice, it is contemplated that the preferred embodiment of the now disclosed inventive section is a unitary construction formed from an injection-molded plastic. In terms of dimensions, the inventor contemplates that each segment would be an equal and fixed thickness equal to an incremental measurement frequently utilized in the construction industry. The inventor believes it particularly useful that the segments be a thickness equal to incremental measurements of the class consisting of one-quarter inch (¼"), one-eighth inch (⅛"), or one-sixteenth inch (1/16"). In this sense and by way of example, a user can have confidence that a spacer comprising five segments stacked will precisely be a five-eighths inch (⅝") spacer, five-sixteenths inch (5/16") spacer, or one and one-quarter inch (1¼") spacer, as the case may be.

With further regard to the dimensions of the inventive section, the inventor contemplates that the foldable hinge component would be a length of injection-molded plastic tapered from its connection point to a segment to a minimum thickness at approximately its midpoint between the two segments. At its midpoint, the foldable hinge component of the preferred embodiment is contemplated to have a width of approximately 0.500", a thickness of approximately 0.015" and a length of approximately 0.17" or more, though the inventor appreciates that the width and thickness may be any that would allow folding of the hinge component while minimizing the material spring resistance inhibiting the folding of the hinge component. In the preferred embodiment, the two segments comprising the inventive section are anticipated to be rounded rectangular prisms approximately 0.750" in width, 0.500" in length, and approximately 0.058" in thickness, though again the inventor contemplates that the inventive section may be of any dimensions that would enable it to still fit into a gap between the mounting arms of an electrical wall plate and the receiving arms of an electrical box as may typically be found during construction.

Reference throughout the specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout the specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

It is understood that the above-described embodiments are only illustrative of the application of the principles of the present invention. The present invention may be embodied in other specific forms without departing from its spirit or essential characteristics. The described embodiment, including the best mode, is to be considered in all respects only as illustrative and not restrictive. The scope of the invention is, therefore, indicated by the appended claims, if any, in conjunction with the foregoing description.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A section of a folding spacer apparatus for ensuring precise spatial increments when stacking segments of the spacer apparatus, the section comprising:
    an elongated and unfolded strip of material with at least two segments each having at least one rounded edge, an upper surface and a lower surface, each segment being equal in thickness with all other segments, each segment being adjoined along its edge to another segment by means of a thin and pliable length of material having a length greater than the thickness of the segments, the length of material being tapered to a minimum thickness at the midpoint in the length of material between the two adjoined segments and being of sufficient length as to allow the upper surface of a first segment to be in flush contact with the lower surface of an adjoined second segment when the length of material is folded at its midpoint.

2. The section of a folding spacer apparatus as recited in claim 1 wherein the length of material adjoining at least two segments has a thickness of 0.015 inches or less at the midpoint in the length of material.

3. The section of a folding spacer apparatus as recited in claim 1, wherein the length of material adjoining at least two segments is at least 0.1732 inches in length between adjoined segments.

4. The section of a folding spacer apparatus as recited in claim 3, wherein the length of material adjoining at least two segments has a thickness of 0.015 inches or less at the midpoint in the length of material.

5. The section of a folding spacer apparatus as recited in claim 1, further comprising:
    at least one protrusion extending perpendicularly from the upper surface of each segment; and
    at least one cavity in the lower surface of each segment, the cavity or cavities being configured to receive the upper surface protrusion or protrusions of an adjoined segment.

6. The section of a folding spacer apparatus as recited in claim 5, wherein the length of material adjoining at least two segments is at least 0.1732 inches in length between adjoined segments.

7. The section of a folding spacer apparatus as recited in claim 6, wherein the length of material adjoining at least two segments has a thickness of 0.015 inches or less at the midpoint in the length of material.

8. The section of a folding spacer apparatus as recited in claim 7, wherein each segment features a plurality of rounded edges.

9. The section of a folding spacer apparatus as recited in claim 8, wherein each segment, exclusive of any protrusion or cavity, is ⅛" in thickness.

10. The section of a folding spacer apparatus as recited in claim 5, wherein each segment, exclusive of any protrusion or cavity, is ⅛" in thickness.

11. The section of a folding spacer apparatus as recited in claim 1, wherein each segment features a plurality of rounded edges.

12. The section of a folding spacer apparatus as recited in claim 1, wherein each segment is ⅛" in thickness.

13. The section of a folding spacer apparatus as recited in claim 1, wherein the entire section is formed from a single contiguous body of a durable but pliable plastic.

14. A section of a folding spacer apparatus for ensuring precise spatial increments when stacking segments of the spacer apparatus, the section comprising:
    an elongated unfolded strip of material with at least two adjoined segments each with at least one rounded edge, an upper surface and a lower surface; wherein each segment has a thickness equal to the thickness of all other segments;
    at least one protrusion extending perpendicularly from the upper surface of each segment;
    at least one cavity in the lower surface of each segment, the cavity or cavities being configured to receive the upper surface protrusion or protrusions of an adjoined segment; and
    a thin and pliable length of material having a length that is greater than the thickness of each of the segments, said pliable length of material adjoining the at least one rounded edge of at least two segments, wherein the length of material has a thickness of 0.015 inches or less at the midpoint in the length of material and is of sufficient length as to allow the upper surface of a first segment to be in flush contact with the lower surface of an adjoined second segment when the length of material is folded at its midpoint.

15. The section of a folding spacer apparatus as recited in claim 14, wherein the length of material adjoining at least two segments is at least 0.1732 inches in length between adjoined segments and each segment, exclusive of any protrusion or cavity, is 1/8" in thickness.

16. A method of installing a spacer in an electrical setting to fill a space of a particular depth, the method comprising:
   providing a spacer with at least two segments each with at least one rounded edge, an upper surface and a lower surface; wherein each of the at least two segments has a precise thickness equal to the thickness of the other of the at least two segments;
   wherein each of the at least two segments are adjoined along the at least one edge to the at least one edge of the other of the at least two segments by a thin and pliable length of material having a length greater than the thickness of each segment;
   selecting a number of the at least two segments based on the amount of space desired to be filled with a spacer and the thickness of the segments;
   folding the number of segments selected such that the upper surface of one of the segments is flush against the lower surface of another of the segments; and
   inserting the selected segments into the space to be filled.

17. The method of claim 16 wherein each of the at least two segments has at least one protrusion on the upper surface of the at least two segments and a cavity configured to receive the at least one protrusion located on the lower surface of the at least two segments; and
   the protrusion from one of the segments is engaged in the cavity of another one of the segments when the segments are folded such that the upper surface of one of the segments is flush against the lower surface of another of the segments.

* * * * *